United States Patent [19]

Bilsback

[11] 4,186,785
[45] Feb. 5, 1980

[54] SELF-STORING BUCKSAW

[76] Inventor: Malvin S. Bilsback, 20 Park Dr., Woodstock, N.Y. 12498

[21] Appl. No.: 926,871

[22] Filed: Jul. 24, 1978

[51] Int. Cl.² .................................................. B27B 21/00
[52] U.S. Cl. .................................................. 145/32 R
[58] Field of Search ................ 145/32 R, 32 A, 32 B, 145/31 R, 33 E

[56] References Cited

U.S. PATENT DOCUMENTS

| 38,338 | 4/1863 | Roberts | 145/32 R |
| 461,063 | 10/1891 | Woesner | 145/32 R |

FOREIGN PATENT DOCUMENTS

| 889673 | 1/1972 | Canada | 145/32 R |
| 545022 | 2/1932 | Fed. Rep. of Germany | 145/32 R |
| 841187 | 2/1939 | France | 145/32 R |
| 254021 | 4/1948 | Switzerland | 145/32 R |

*Primary Examiner*—James L. Jones
*Assistant Examiner*—J. T. Zatarga
*Attorney, Agent, or Firm*—Joseph J. Connerton

[57] ABSTRACT

A collapsible self-storing bucksaw includes the blade, a compression member, a tension member, and a pair of handle members. The handle assembly comprise a pair of hollow tubular members which fit together in telescopic fashion. When disassembled, the tension member fits within the compression member, while the compression member and saw blade fit within the handle assembly. In the disassembled state, the handle includes threaded fastening members connected to opposite ends of the tension member to hold the component within the handle assembly. The beneficial effects of a bucksaw are thus provided in a strong lightweight structure adapted for hunting, fishing, back-packing, camping, and similar outdoor recreational activities.

3 Claims, 5 Drawing Figures

SELF-STORING BUCKSAW

BACKGROUND OF THE INVENTION

In various outdoor recreational activities, such as hunting, fishing, camping, back-packing, etc., particularly in wilderness areas, it is frequently necessary for participants to provide wood cutting capabilities. One of the most efficient wood cutting devices is the bucksaw, but conventional bucksaw assemblies have definite limitations particularly as to size, bulk, and portability. The relative bulk and weight of conventional bucksaw assemblies, the necessity of shielding the blade to eliminate the risk of personal injury, dulling the teeth of the blade or damage to other equipment tend to limit the application of bucksaws to normal wood cutting operations. Thus there is a need in the art for providing the cutting capabilities of the bucksaw in a form adaptable for the outdoor recreational activities of hunting, fishing, camping, back-packing, etc.

BRIEF SUMMARY OF THE INVENTION

In accordance with the present invention there is provided a portable bucksaw assembly which combines the efficiency of the bucksaw with the lightweight, rigid construction and portability features required for outdoor recreational activities. The bucksaw assembly is made of lightweight components such as aluminum or stainless steel hollow tubular handle and compression members, lightweight tension members and a blade, all adapted for rapid assembly and disassembly. The handle members are hollow tubular members which telescope together to form a container for the remaining components, the dimensions of which are designed to fit and be housed within the tubular container for portability, minimum size and weight consideration without sacrificing rigidity and strength. The device is designed with a minimum number of parts for rapid assembly and disassembly, and combines the cutting features and characteristics of the conventional bucksaw with the portable requirements for outdoor recreational activity.

Accordingly, a primary object of the present invention is to provide an improved bucksaw assembly.

Another object of the present invention is to provide a portable bucksaw assembly combining the cutting characteristics of a conventional bucksaw with the portable characteristics of an outdoor recreational device.

Still another object of the present invention is to provide a bucksaw assembly in which the blade, compression, and tension members are adapted to be housed within a pair of handle members for ease of carrying.

Another object of the present invention is to provide a collapsible saw of the bucksaw type in which the bucksaw components are designed for housing within a pair of hollow tubular handle members.

DETAILED DESCRIPTION

Figure 1:
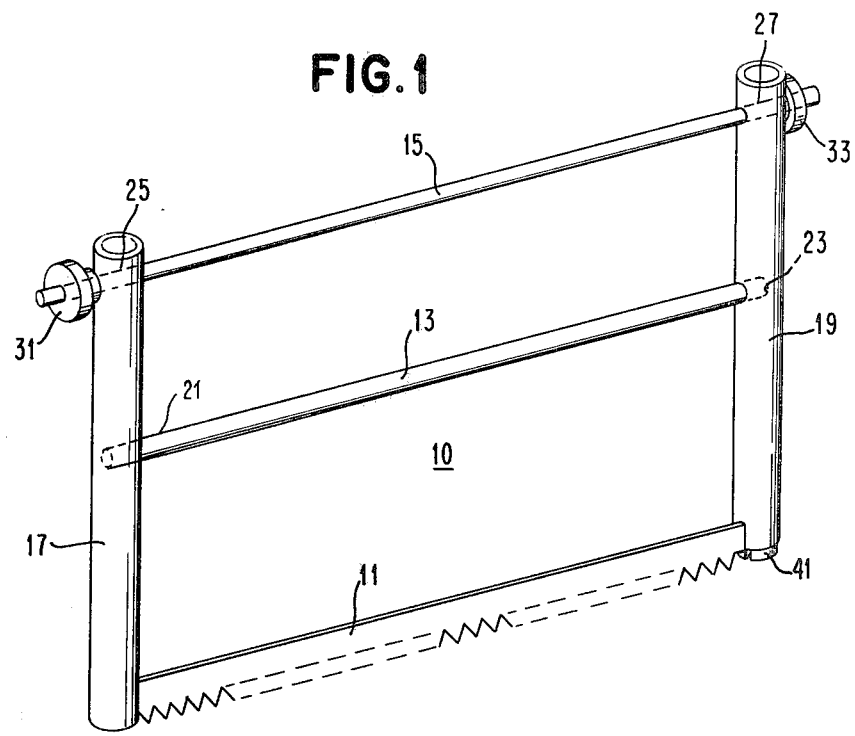
FIG. 1 is a perspective view of the instant invention in an assembled condition.

Referring now to the drawings and more particularly to FIG. 1 thereof, a bucksaw assembly 10 comprises a saw blade 11, a compression member 13, and a tension linkage 15. Handle members comprising hollow tubes 17, 19 disposed on opposite ends of the above components complete the assembly. The opposite ends of saw blade 11 are attached to each of handle members 17, 19 in a manner more fully described hereinafter. Compression member 13 comprises a hollow tubular member adapted to fit within openings 21, 23 of handle members 17, 19 respectively. The tension linkage 15 is a rod member adapted to fit through corresponding openings 25, 27 in handle members 17, 19 respectively, and tension is controlled by adjustment of knurled thumb nuts 31, 33 on the threaded end portions of tension rod 15. The single tension rod 15 and associated thumb nuts 31, 33 represent a significant improvement over the turn buckles normally associated with conventional tension linkages in bucksaw assemblies. When assembled as shown in FIG. 1 with handle members 17, 19 substantially parallel, the assembly represents a bucksaw with a slightly modified configuration but substantially improved with respect to bulk, weight and portability characteristics, or more fully described hereinafter.

Figure 2:
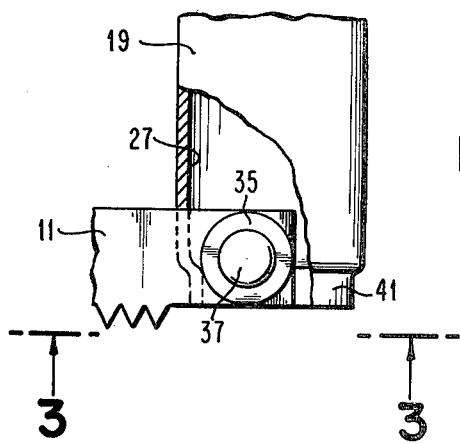
FIG. 2 is a fragmentary elevation view of the invention to illustrate the connecting arrangement of the handle member and the saw blade.
Figure 3:
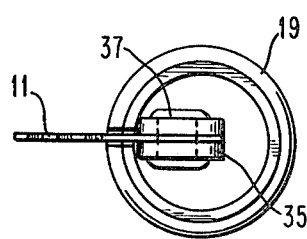
FIG. 3 is a sectional view taken along the lines 3—3 of FIG. 2.

Referring now to FIG. 2, the detailed interconnection of handle member 19 and saw blade 11 is illustrated. Blade 11 has nylon washers 35 attached to ends thereof, which, as more clearly shown in FIG. 3, are attached to the blade by rivets 37. Each handle member has a slotted opening in the bottom portion for permitting each end of the blade to be slid into position in each handle member. In the assembly sequence, the blade would be placed in position within each member of the handle assembly, followed by the compression member secured to the handle members, with the tension member 15 being attached to each handle member last. One of the thumb nuts, nut 31 for example, can be permanently attached to one end of the tension member 15, while the other thumb nut 33 is allowed to turn freely for assembly and tensioning. By tightening the nut 33 the threaded rod 15 is put in tension, thus pivoting the handles 17, 19 about the ends of compression member 13. This action in turn puts the saw blade 11 in tension, providing a rigid frame and blade for efficient cutting.

Figure 4:
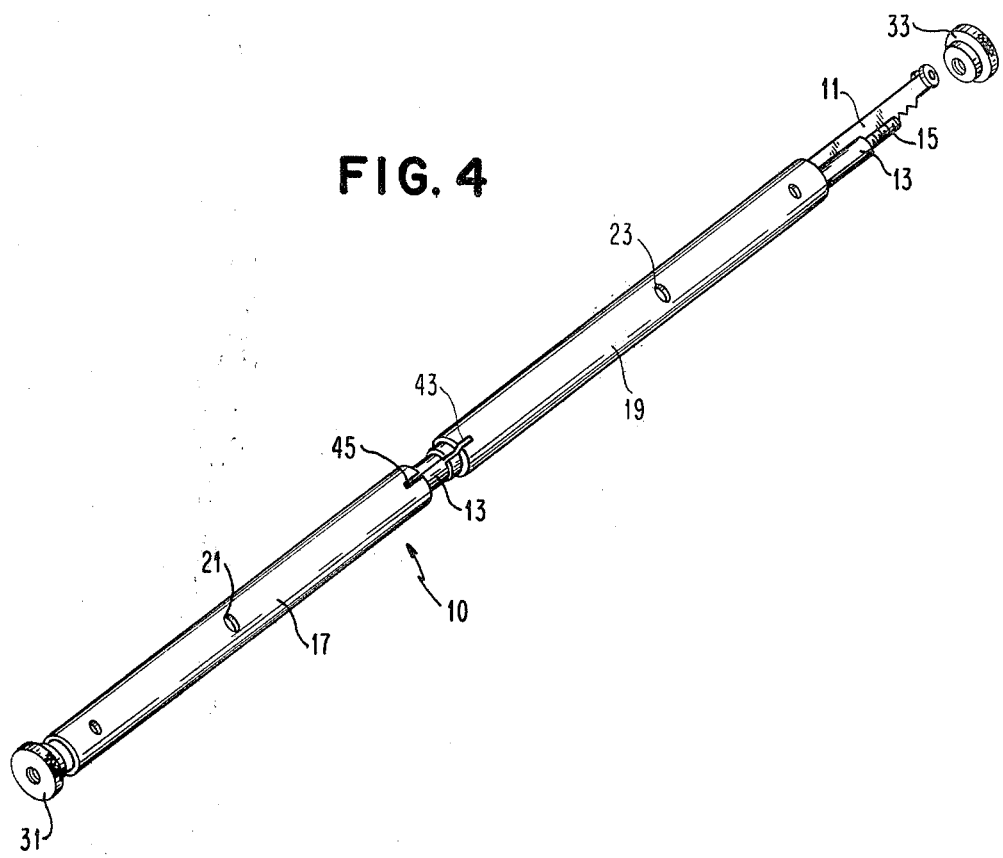
FIG. 4 is an exploded perspective view of the bucksaw assembly partially encased within the handle assembly.
Figure 5:
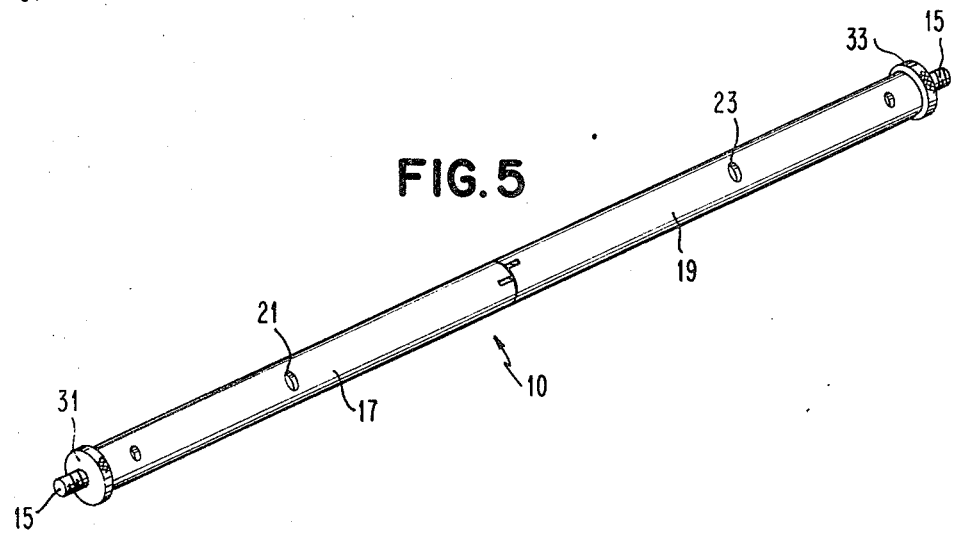
FIG. 5 is a perspective view of the instant invention completely enclosed within the handle assembly.

Referring now to FIG. 4, the bucksaw is illustrated unassembled to clarify how the various components combine into a single cylindrical assembly. Handle member 19 has a necked down portion 41 which provides a telescopic fit within handle member 17. Such necking down of tubular members can be provided by various means known in the art such as the use of a modified pipe cutter. The necked down portion slides into handle member 17. The hollow tubular compression member 13 is designed to fit within the tubular handle member assembly, and in turn functions as a housing for the tension rod 15. Blade 11 fits within the handle assembly but as a separate element. Thus the handle assembly need only accommodate the blade and compression member. The knurled thumb nuts, 31, 33 attach to their associated ends of tension rod 15 to secure and maintain the elements within the closed container as illustrated in FIG. 5. By making the assembly and particularly the tubular members of lightweight nonrusting material such as aluminum tubing, a strong structure which retains all of the characteristics of conventional bucksaw assemblies without the attendant size and weight problems associated with conventional bucksaw assemblies is provided. The device is simple to assemble and disassemble and made of relatively long life materials to provide simplified construction and associated low cost. The saw blade is protected during the housed position so that wear of the blade or damage to the carrier is avoided. Finally, the device would be made in a variety of sizes depending on the anticipated workload. As representative of a preferred embodiment of the invention, a 22" self storing bucksaw assembly may comprise two 11" handle members of 1.25" O.D. (outside diameter), a compression member of 21.62"×0.50" O.D., a threaded tension rod of 22.37"×0.25" O.D. and a 22" standard commercially available saw blade.

While the invention has been shown and described with reference to a preferred embodiment thereof, it will be understood by those skilled in the art that other changes in form and detail may be made therein without departing from the spirit and scope of the invention.

I claim:

1. A self-storing buck saw assembly having an assembled and a stored condition comprising in combination
 a frame including a handle assembly, a compression member and a tension member,
 a saw blade of predetermined length,
 said handle assembly comprising a pair of hollow tubular handle members of substantially equal size,
 one tubular handle member being formed for interconnection to the other handle member of each said pair to form a carrier assembly for the remainder of said buck saw components,
 said tension member comprising a solid rod having screw portions at opposite ends, and
 a pair of tension adjustments means associated with opposite ends of said tension rod,
 said tension adjusting means comprising a pair of thumb nuts on opposite ends of said tension rod, the outer diameter of each thumb being larger than the inner diameter of each tubular handle member
 said blade, tension and compression members being contained within said handle assembly when said buck saw is in said store condition,
 said tension adjusting means adjusting the tension of said tension member when said buck saw is in the assembled condition,
 and also functioning as end members of said carrier assembly when said buck saw is in said store condition whereby only those components of said buck saw assembly utilized in said assembled state are utilized in said store state said tension member being longer than the interconnected length of said tubular handle members by the length of said screw portions so that in the stored condition the tension member may be inserted into the interconnected tubular handle members with the said screw portions extending at opposite ends and the thumb nuts screwed down the said screw portions to close the interconnected tubular handle members at opposite ends with the blade and compression member therewithin and retain the handle members in the interconnected carrier condition.

2. A device of the type claimed in claim 1 wherein said interconnection of said pairs of handle members is provided by telescoping one end of said first handle member over the necked down end of said second handle member.

3. A device of the character claimed in claim 1 wherein said compression member is a hollow cylinder adapted to contain the associated tension rod.

* * * * *